United States Patent [19]
Branca et al.

[11] Patent Number: 5,630,897
[45] Date of Patent: May 20, 1997

[54] PROCESS FOR MAKING A CONTINUOUS STRUCTURE OF A COMPOSITE MATERIAL

[75] Inventors: Alfonso Branca; Giuseppe Marinelli, both of Milan, Italy

[73] Assignee: Somiver S.R.L., Italy

[21] Appl. No.: 489,504

[22] Filed: Jun. 12, 1995

[30] Foreign Application Priority Data

Jun. 28, 1994 [IT] Italy ................... MI94A1337

[51] Int. Cl.[6] .................................................. B32B 31/14
[52] U.S. Cl. ..................... 156/148; 156/64; 156/160; 156/229; 156/292; 139/410; 139/420 C; 139/420 R
[58] Field of Search ........................ 156/148, 292, 156/160, 161, 229, 64; 181/292, 290; 139/384 R, 410, 420 R, 420 C

[56] References Cited

U.S. PATENT DOCUMENTS

| | | | |
|---|---|---|---|
| 3,234,972 | 2/1966 | Koppelman et al. | 139/410 |
| 4,389,447 | 6/1983 | Disselbeck et al. | 156/148 X |
| 4,971,642 | 11/1990 | Schwan | 156/184 X |
| 5,143,569 | 9/1992 | Gotoh et al. | 156/72 X |
| 5,166,480 | 11/1992 | Bottger et al. | 181/292 |
| 5,240,533 | 8/1993 | Bottger et al. | 156/148 |

OTHER PUBLICATIONS

Verpoest, I., et al, "2.5D–and 3D–Fabrics for Delamination Resistant Composite Laminates and Sandwich Structures," Sampe Journal, vol. 25, No. 3, May/Jun. 1989, pp. 51–56.

*Primary Examiner*—Jeff H. Aftergut
*Attorney, Agent, or Firm*—Laff, Whitesel, Conte & Saret, Ltd.

[57] ABSTRACT

The described process for making a continuous composite material structure (50) starts from a continuous semifinished product (1) made of a reinforcing fiber comprising an upper layer (4) and a lower layer (5) facing each other and mutually connected by intermediate threads (6). It comprises the steps of moving the continuous semifinished product (1) along a working path; impregnating the semifinished product (1) with a resin; coupling a lower surface of the continuous semifinished product (1) with a first ribbon (23); moving one of said layers (4, 5) apart from the opposite layer for bringing the intermediate threads (6) from a first condition in which they are disposed substantially parallel to the two external layers (4, 5) to a second condition in which they are disposed transversally of the external layers; and polymerizing the impregnated semifinished product (1) to make the continuous structure (50).

15 Claims, 4 Drawing Sheets

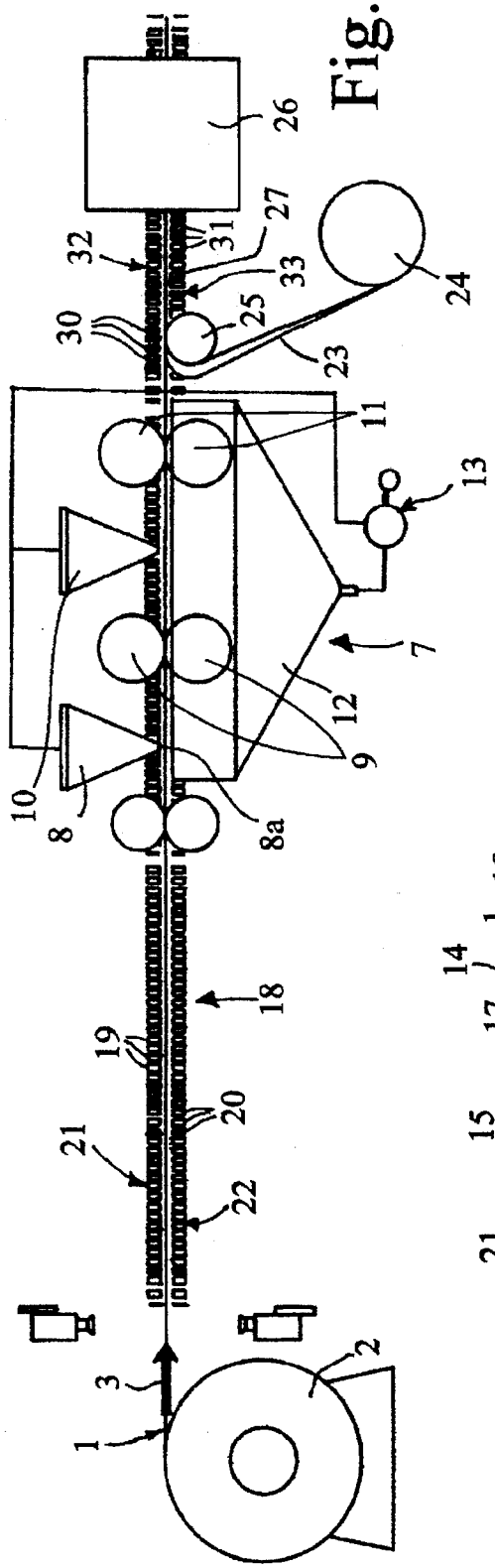
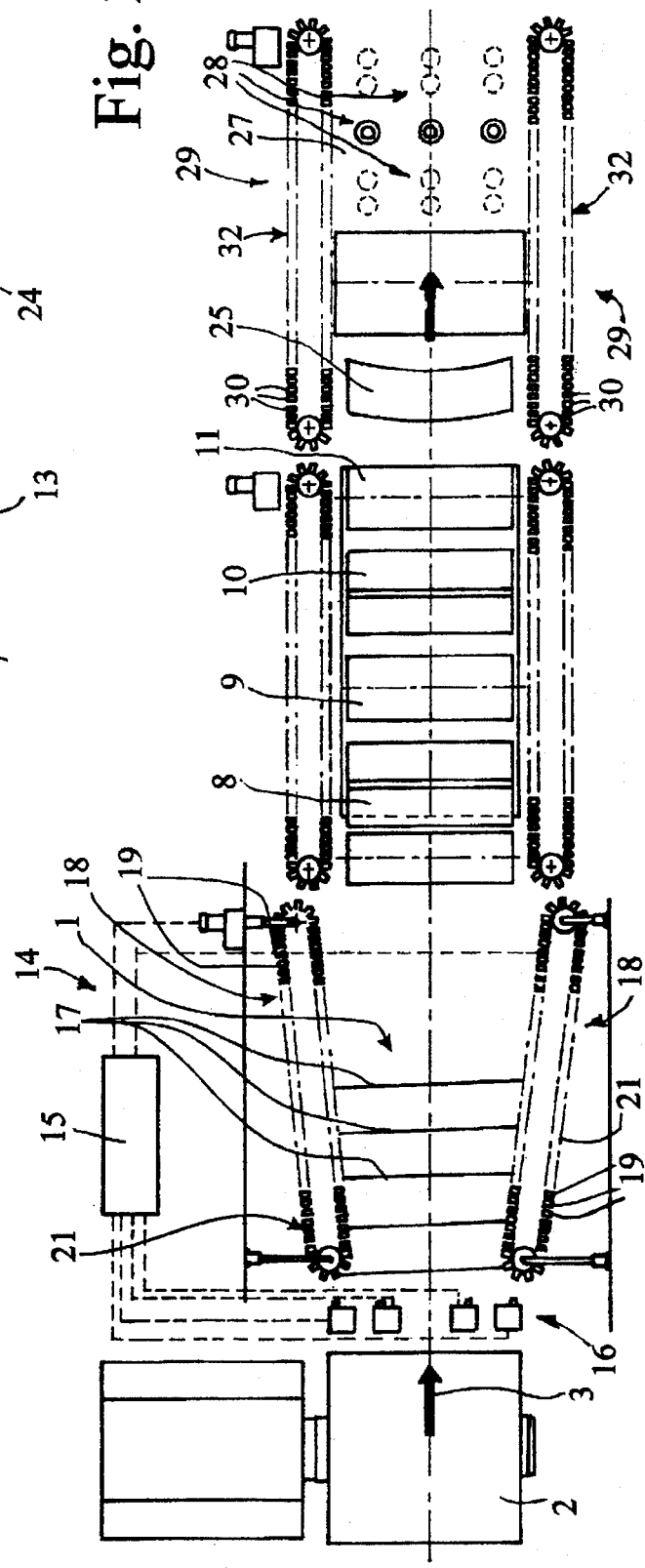

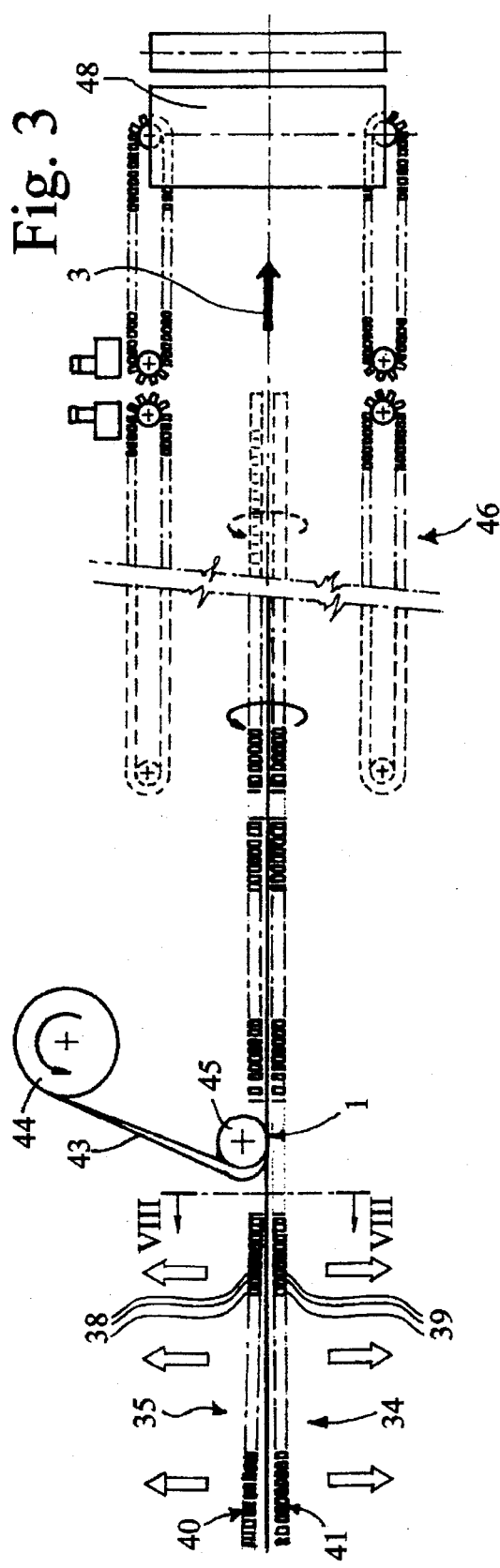
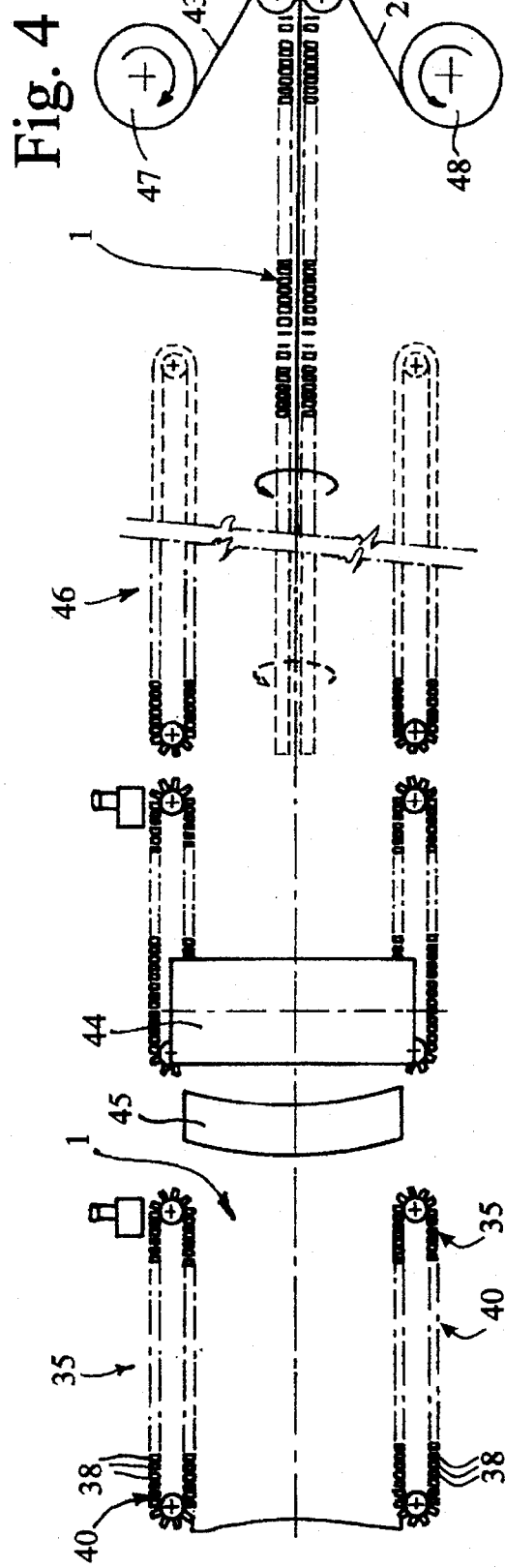
Fig. 3
Fig. 4

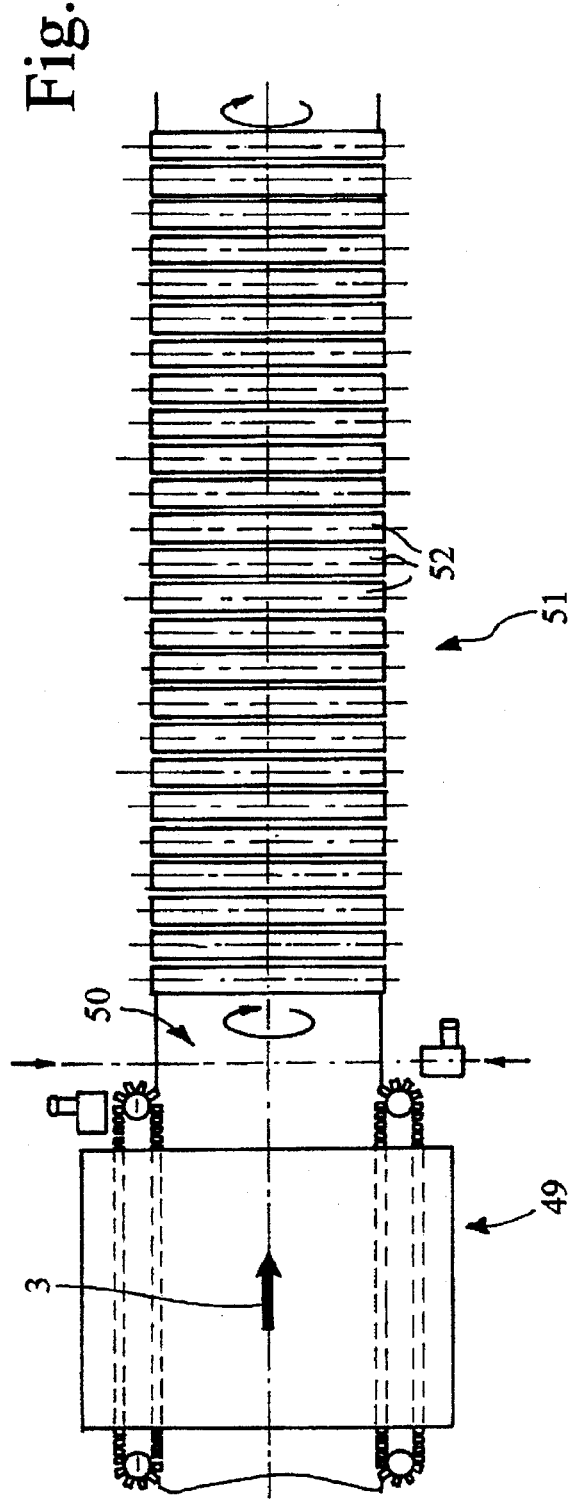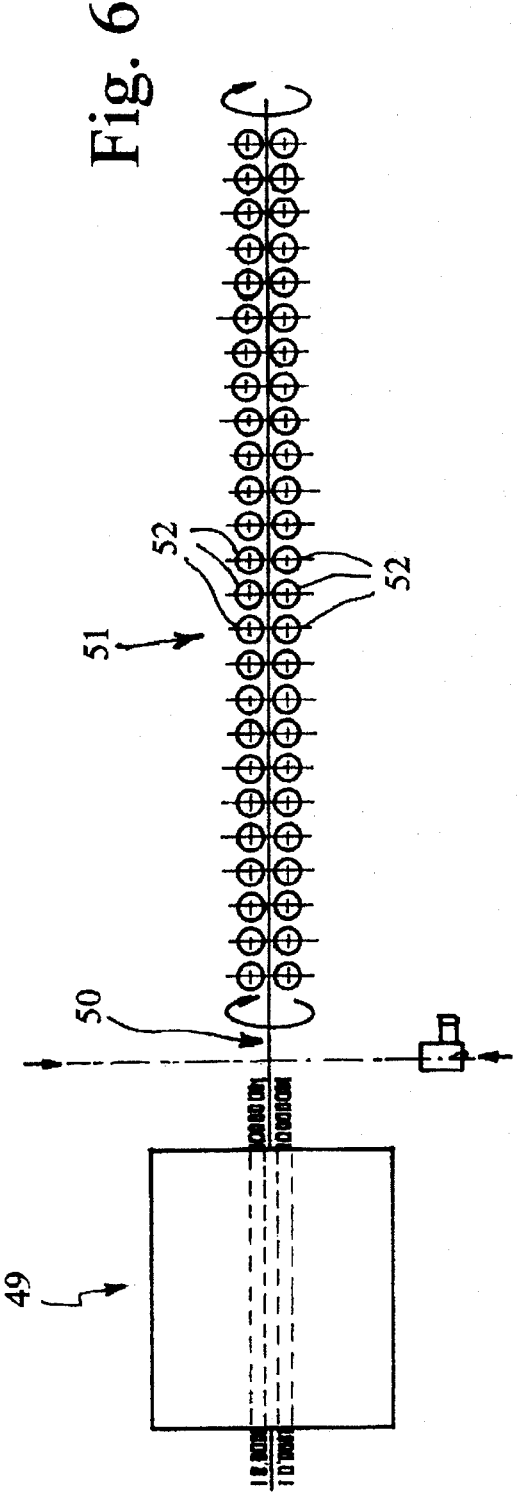

Fig. 7
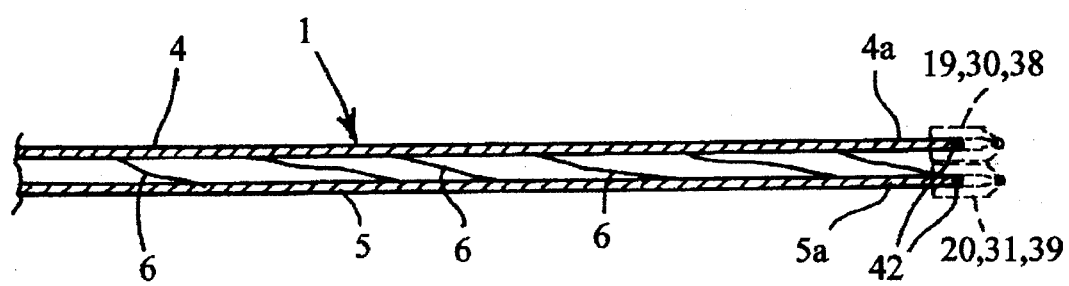
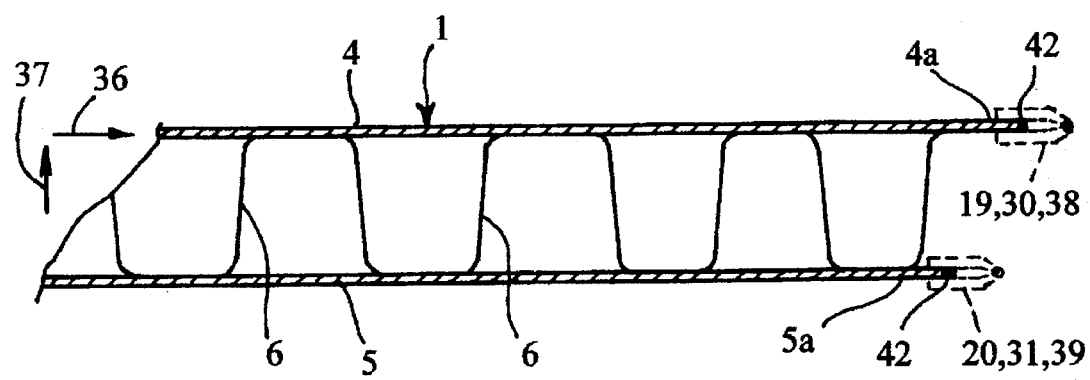
Fig. 8

PROCESS FOR MAKING A CONTINUOUS STRUCTURE OF A COMPOSITE MATERIAL

FIELD AND BACKGROUND OF THE INVENTION

The present invention relates to a process for making a continuous structure of a composite material.

It is known that the spreading of composite materials is becoming increasingly more extended in several different technical fields due to the good features of same in terms of mechanical strength, stiffness, capability of reaching a good heat sound and electric insulation, good resilience, and others. In more detail, panels made of composite materials which are increasingly more required on the market find application either as covering elements for furniture or indoor fittings, or as structural parts such as ribs or frames for shell constructions, or as parts of means of transport, and so on.

Under this situation, different types of structures in the form of panels made of a composite material capable of meeting the most various requirements have been developed. These structures are differentiated from each other both for the different material types employed and the different arrangement of the reinforcing fibers within the resin matrix.

In the present treatment reference will be particularly made to panels of a composite material comprising a resin matrix within which a three-dimensional reinforcing structure is incorporated which is made of textile fibers comprising two external layers interconnected by intermediate connecting threads.

These types of panels are presently manufactured starting from a semifinished textile product, made of fiberglass for example, which substantially has the same sizes as the intended panels.

The semifinished product is then impregnated with resin and inserted between two mold halves of a press after interposing a pair of plates, each of which faces one of the external layers of the semifinished product.

Subsequently, after fixing the plates to the respective mold halves, said halves are partly closed in order to promote a homogeneous distribution of the resin. Afterwards, a partial polymerization is carried out for fixing said plates to the external layers of the impregnated semifinished textile product. At this point, the mold halves, together with said plates, are moved apart from each other by a predetermined distance so that the connecting threads of the two layers in the semifinished textile product move from a first condition in which they are substantially reclined and arranged parallel to the external layers, to a second condition in which they are disposed substantially perpendicular to the external layers themselves.

Finally a complete polymerization of the resin is carried out followed by drawing of the composite structure out of the mold.

While the above described process enables the achievement of panels of a composite material having good mechanical features and a good degree of surface finish, it also has many drawbacks.

First of all it is to note that since the process is carried out by molding, due to its own nature only single-size panels can be made. Therefore, it is necessary to have as many molds as there are panels to produce or, alternatively, to arrange sufficiently extended molds for producing panels of relatively large sizes which are then conveniently cut. However, in the last mentioned case many important problems arise both as regards construction and economy, since molds of great sizes are to be made and consequently presses capable of operating said molds are needed.

It should be also recognized that the above described molding process is very slow and therefore enables very low production rates to be achieved, which results in higher costs of the final product, also taking into account the fact that, when the polymerization step is completed, a further step of drawing the panels out of the mold halves is always necessary.

SUMMARY OF THE INVENTION

Under this situation, the main aim of the present invention is to devise a process for making a continuous structure of a composite material which is capable of substantially solving all the above mentioned drawbacks.

In particular, it is a fundamental object of the invention to provide a process allowing said composite material structure to be continuously manufactured thereby avoiding the use of molds, so that very high production rates are achieved in combination with reduced production costs.

The foregoing and further objects that will become more apparent in the following of the present description are substantially achieved by a process for making a continuous structure of a composite material comprising the following steps:

moving a continuous semifinished product made of a reinforcing fiber along a predetermined working path, said continuous semifinished product comprising an upper external layer and a lower external layer facing said upper external upper and the lower external layers being mutually connected by a plurality of intermediate threads;

impregnating said continuous semifinished product with a given resin at an impregnation station disposed along said working path;

moving one of said two layers of the continuous semifinished product apart from the opposite layer to bring said intermediate threads from one condition in which they are reclined and arranged substantially in parallel relationship with said two external layers, to a second condition in which they are disposed substantially perpendicular to the external layers;

polymerizing the impregnated semifinished product at a polymerization station, so as to achieve a continuous composite material structure;

wherein before said impregnation step, an adjustment step for putting the two layers of said continuous semifinished product in register, is carried out at an adjustment and control station in which the position of said external layers is verified, said adjustment step comprising the following sub-steps:

detecting reference marks associated with the upper external layer and lower external layer of said semifinished product, by detection means operating above and under said continuous semifinished product, said detection means sending corresponding signals to a processing unit following passage of said reference marks;

aligning the reference marks associated with the upper external layer with the reference marks associated with the lower external layer by first grasping and advancement means operating at either side of said semifinished product and controlled by said processing unit.

BRIEF DESCRIPTION OF THE DRAWINGS

Further features and advantages will be best understood from the detailed description of a preferred embodiment of a process for making a continuous composite material structure according to the present invention. This description will be given hereinafter, by way of non-limiting example, with reference to the accompanying drawings, in which:

FIG. 1 is a side view showing the first steps of the process of the invention;

FIG. 2 is a top view showing the process step referred to in FIG. 1;

FIG. 3 is a side view showing intermediate steps of the process of the invention, subsequent to the steps shown in FIG. 1;

FIG. 4 is a top view of the steps shown in FIG. 3;

FIG. 5 is a side view of the final steps in the process in reference;

FIG. 6 is a top view of the process steps shown in FIG. 5;

FIG. 7 is a fragmentary sectional view taken along line VII—VII in FIG. 1; and

FIG. 8 is a fragmentary sectional view taken along line VIII—VIII in FIG. 3.

DESCRIPTION OF THE PREFERRED EMBODIMENT

We refer to FIGS. 1 to 6. The plant therein outlined diagrammatically shows the steps of a process for making a continuous composite material structure according to the present invention.

In particular, as shown in FIG. 1, a continuous semifinished product 1 made of a reinforcing fiber, such as a fiberglass, is provided to be unwound from a supply reel 2 and moved in the direction shown by arrow 3 along a predetermined working path. It is pointed out that, as an alternative solution, the supply reel 2 can be replaced by a dedicated loom that, conveniently fed with the reinforcing fiber, directly produces the continuous semifinished product to be fed along the working path.

As clearly shown in FIG. 7, the continuous semifinished product 1 comprises one upper external layer 4 and one lower external layer 5 facing each other and mutually connected by a plurality of intermediate threads 7.

The continuous semifinished product 1 is moved forward from the supply reel 2 to an impregnation station 7 at which the semifinished product will be conveniently impregnated with a given resin.

In greater detail, the impregnation station 7 comprises one hopper 8 operating above and close to the continuous semifinished product 1 so that its lower delivery end 8a is substantially flush with the upper external layer 4 of the semifinished product 1. Essentially, the first hopper 8 is such arranged that it deposits predetermined amounts of impregnation resin onto the semifinished product 1, which resin, under gravity, will tend to pass through the semifinished product. In order to ensure a better spreading of the resin, and discharge of the excess resin, if any, provision is made for a first pair of squeezing rollers 9 operating immediately downstream of the first hopper 8 and active on the semifinished product 1. Provision may be also made, as shown in FIG. 1, for a second hopper 10 operating above and close to the semifinished product 1 as well, and disposed downstream of the first pair of squeezing rollers 9, and also a second pair of squeezing rollers 11 operating immediately downstream of the second hopper 10. The second hopper 10 and second pair of squeezing rollers 11 operate substantially in the same manner as described with reference to the first hopper 8 and first pair of squeezing rollers 9, respectively.

Obviously, in particular cases other impregnating hoppers may be provided along the line.

It should be noted that, for collection of the possible excess resin, the impregnation station 7 will also comprise a collecting basin 12 located under the continuous semifinished product 1 and extending from the first hopper 8 to the second pair of squeezing rollers 11. Also associated to advantage with the collecting basin 12 is recycling means 13 designed to convey the resin stored in the collecting basin 12 towards the first and second hoppers 8, 10.

In an original manner, before carrying out the above described impregnation step, an adjustment step is executed for securing an exact longitudinal and/or transverse correspondence between the two layers of the continuous semifinished product. This adjustment step is made at an adjustment and control station 14 verifying the mutual position of the external layers 4 and 5. The adjustment and control station 14 is located immediately downstream of the supply reel 2 and comprises a processing unit 15 and optoelectric detection means 16, for example consisting of cameras, photoelectric cells or other systems of known type operating above and under the continuous semifinished product 1. The detection means 16 carries out a step of detecting transverse and/or longitudinal reference marks 17, associated with the upper external layer 4 and the lower external layer 5 of said semifinished product 1, respectively. Said reference marks may merely consist of transverse and/or longitudinal stripes, for example in colors different from those of the rest of the continuous semifinished product 1, and suitably spaced apart from each other in the longitudinal and transverse directions, respectively.

In particular, these marks can be made either of textile, synthetic or organic materials, or of a metal material to be detected by sensors of the magnetic type, or yet of other materials that can be read by reading systems of any type.

The detection means 16, following passage of said reference marks 17, sends corresponding signals to the processing unit 15. Should this unit register offsettings between the marks on the upper external layer 4 and the corresponding marks on the lower external layer 5, it will in turn send driving signals to first grasping and advancement means 18 operating at either side of the semifinished product 1. The first grasping and advancement means 18, upon command of the processing unit 15, carries out a constant mutual alignment of the reference marks 17 associated with the external upper and lower layers 4 and 5. Preferably, in order to carry out said alignment step, the first grasping and advancement means 18 comprises a series of upper grippers 19 and a series of lower grippers 20, each carried by respective conveyor chains 21, 22 and operating in engagement relationships on the upper external layer 4 and lower external layer 5, respectively.

It is pointed out that the grasping and advancement means 18 in addition to carrying out said adjustment operations, if necessary, upon command of the unit 15, cooperates in dragging along the continuous semifinished product 1 to the impregnation station 7.

Once the semifinished product has been conveniently put in register and impregnated, a lower surface of said semifinished product is coupled with a first ribbon 23 which moves parallelly to the continuous semifinished product 1 over at least one stretch of said operating path (first pairing step). In more detail, the first ribbon 23 is unwound from a reel 24 and sent to a stretching roller 25 operating very close to the lower surface of the continuous semifinished product 1 and having a curved conformation the concavity of which faces the feed direction of the continuous semifinished product shown by said arrows 3. After the first ribbon has been conveniently paired, a prepolymerization step may be carried out. This step takes place at a corresponding prepolymerization station 26 and is designed to make the first ribbon 23 integral with the lower surface of the impregnated continuous semifinished product 1. In other words, prepolymerization occurs to such a degree that it exclusively involves the external layers of the semifinished product 1, in order to connect the ribbon 23 to the lower surface of said semifinished product with a certain steadiness. Under this situation, the first ribbon 23, during its translation movement, also exerts a pulling action on the semifinished product 1. It should be noted that during the above described prepolymerization step the first ribbon 23 sealingly rests on a work supporting table 27 and is smoothed and stabilized due to the intervention of suction means 28. Said suction means is associated with the work supporting table 27 and, by carrying out smoothing and stabilization of the first ribbon, gives the product while being worked a high surface finish.

Alternatively to said suction means 28, second grasping and advancement means 29 associated with each of the semifinished product sides may be provided for accomplishing said smoothing and stabilization step on the first ribbon 23 before the prepolymerization step.

In the same manner as the first means 18, said second grasping and advancement means 29 comprises a series of upper grippers 30 and a series of lower grippers 31, each carried by respective conveyor chains 32, 33, operating in engagement relationship on the upper external layer 4 and lower external layer 5 respectively. In this case as well, the second means 29 cooperates in dragging along the continuous semifinished product 1.

After the above described steps, the semifinished product 1 reaches a work station 34 in which third grasping and advancement means 35, associated with either side of the continuous semifinished product 1 and operating downstream of the prepolymerization station 26, acts on the semifinished product 1 for performing a spacing step involving moving apart of one of the external layers 4, 5 of the semifinished product from the opposite layer. During this step the intermediate threads 6 are brought from a first condition, in which they are reclined and arranged substantially parallel to the external layers 4 and 5 (FIG. 7), to a second condition in which they are disposed transversally of the external layers themselves (FIG. 8). In other words, the intermediate threads 6 perform a transverse sliding movement along a broken line shown by arrows 36, 37 in FIG. 8 and take a position that, depending on requirements, can be either substantially perpendicular to the external layers 4 and 5 or inclined to said layers according to an angle of 45° or 60° for example.

The third grasping and advancement means 35 performs moving apart of one external layer 4 from the other external layer 5 by means of a series of upper grippers 38 and a series of lower grippers 39, each carried by respective conveyor chains 40, 41 and operating in engagement relationship on the upper external layer 4 and lower external layer 5, respectively. It is to note that, for carrying out the desired step of moving the upper external layer 4 away from the lower external layer 5 as above described, the two conveyor chains 40 (one on each side of the semifinished product) of the upper grippers 38, while being parallel to each other, are inclined to the conveyor chains 41 of the lower grippers 39. More particularly, moving in the upstream-to-downstream direction, each conveyor chain 40 is inclined and diverges from the underlying conveyor chain 41 associated with the same side of the continuous semifinished product 1. Chains 40 and 41 diverge from each other to such an extent that they enable the desired moving apart of the upper external layer 4 from the lower external layer 5 to take place.

It should be also recognized that grippers 38 and 39, as well as obvioulsy grippers 30 and 31 and 19 and 20 previously described, act in engagement relationship on longitudinal graspable elements such as ribs, metal straps or others (see FIGS. 7 and 8) associated with the side edges 4a and 5a of the upper and lower external layers 4 and 5.

Immediately after carrying out the step of moving apart the external layers 4 and 5 from each other, another pairing step is provided which involves coupling of a second ribbon 43 with an upper surface of the continuous semifinished product 1.

Immediately upstream of the second ribbon 43 operation of an auxiliary hopper (not shown) may be provided, which is designed to distribute a resin film on the upper surface of the continuous semifinished product.

Like the first ribbon 23, the second ribbon 43 too is unwound from a corresponding supply reel 44 and sent to a stretching roller 45 operating very close to the upper external layer 4 of the continuous semifinished product 1. In order to ensure a good unfolding and stretching out of the second ribbon 43 on the semifinished product 1, the second stretching roller 45 too has a curved conformation the concavity of which faces the feed direction of said semifinished product.

When the second ribbon 43 too has been coupled with the semifinished product 1, the latter may be optionally sent to an overturning station 46 in which the semifinished product is rotated substantially through 90° so that it is disposed in a vertical lying plane. Subsequently, also a step in which the first and possibly the second ribbon too are disengaged from the continuous semifinished product 1 may be provided. In this case rewinding cylinders 47 and 48 suitably powered are provided.

It should be remembered that this step is linked to the type of product one wishes to achieve. Actually, if the product to be obtained must have perfectly smooth surfaces, the first and second ribbon will not be disengaged from the semifinished product 1. Conversely, if one or both of the surfaces of the final product need to be relatively porous, one of said ribbons (23 or 43) or both of them will be disengaged.

At all events, after the semifinished product 1 optionally coupled with one or both of said ribbon 23, 43, has been overturned, this product comes to a polymerization station 49 in which a final polymerization step is carried out in order to obtain the continuous composite-material structure 50. It is pointed out that a pulling station of the composite material 50, not shown as it is of a conventional type, is in operation downstream of the polymerization station 49.

After the polymerization step, the continuous composite material structure 50 may also be subjected to a subsequent soaking step, in which a filling resin is injected into the continuous structure so as to fill all porosities. This step is carried out at a soaking station 51 in which the composite structure is guided by a plurality of vertical cylinders 52 arranged in two parallel rows, so as to define an advancement path lying in a vertical plane.

Finally, after the continuous composite material structure 50 has undergone the optional soaking step, cutting steps (not shown) take place in succession so as to obtain panels of the desired sizes.

The invention achieves important advantages.

In fact, it should be pointed out first of all that by virtue of the process in question continuous composite material structures of a practically indefinite length and the width of which makes it possible to produce panels of any sizes can be manufactured, said structures being capable of complying with all requirements.

In addition, since the process is carried out in line, with a continuous or stepped feeding, without the utilization of molds being necessary, very high production rates can be achieved while keeping reduced production costs.

It should be also noted that, since the molds typical of the known art have been eliminated, the steps of introducing the impregnated textile semifinished product into the molds, and the steps of taking the finished product out of the molds are avoided. In this manner, a further increase in the production speed as compared with the presently used processes is reached.

Furthermore, by virtue of the process of the invention if one wishes to produce a porous panel, the first 23 and second 43 ribbons can be disengaged very easily.

Therefore, in substance the process in question offers a great flexibility and enables panels of any sizes and showing differentiated surface features to be made, depending on requirements. In addition, this process is also advantageous in its details.

Actually, due to the adjustment step performed through the alignment of the transverse and/or longitudinal reference marks 17, the final product is of excellent quality. In fact, it should be remembered that if the upper external layer 4 is not perfectly in register with the lower layer 5, the intermediate threads on the finished composite material structure 50 will be arranged in an incorrect manner, that is for example not perpendicular to the external layers 4 and 5, which will result in a reduction, even to a great extent, of the mechanical strength features of the structure itself.

As regards the step of coupling the first ribbon 23 with the second ribbon 43, it is pointed out that since the stretching rollers 25 and 45 have a curved conformation, they ensure a perfect unfolding and stretching out of the ribbons, so that the external surfaces of the final product are perfectly smooth and free of roughness.

Obviously, many modifications and variations may be made to the process as described, which do not constitute a departure from the true scope of this invention as claimed in the following claims.

What is claimed is:

1. A process for making a continuous structure of a composite material comprising the following steps:

moving a continuous semifinished product (1) made of a reinforcing fiber along a predetermined working path, said continuous semifinished product (1) comprising an upper external layer (4) and a lower external layer (5) facing said upper external layer, the upper and the lower external layers being mutually connected by a plurality of intermediate threads (6);

impregnating said continuous semifinished product (1) with a given resin at an impregnation station (7) disposed along said working path;

moving one of said two layers (4,5) of continuous semifinished product (1) apart from the other facing layer to bring said intermediate threads (6) from one condition in which they are reclined and arranged substantially in parallel relationship with said two external layers (4,5), to a second condition in which they are disposed substantially perpendicular to the external layers;

polymerizing the impregnated semifinished product (1) at a polymerization station (40), so as to achieve a continuous composite material structure (50);

wherein before said impregnation step, an adjustment step for putting the two layers of said continuous semifinished product (1) in register is carried out at an adjustment and control station (14) in which the position of said external layers is verified;

said adjustment step comprising the following sub-steps:
detecting reference marks (17) associated with the upper external layer (4) and lower external layer (5) of said semifinished product (1), by detection means (16) operating above and under said continuous semifinished product (1), said detection means (16) sending corresponding signals to a processing unit (15) following passage of said reference marks (17);

aligning the reference marks (17) associated with the upper external layer (4) with the reference marks (17) associated with the lower external layer (5) by first grasping and advancement means (18) operating at either side of said semifinished product (1) and controlled by said processing unit (15).

2. The process as claimed in claim 1, wherein between said impregnation step and moving step, a pairing step is carried out for coupling at least one lower surface of said continuous semifinished product (1) with a first ribbon (23) moving parallelly to said continuous semifinished product (1) over at least one stretch of said working path and operating downstream of said impregnation station (7).

3. The process as claimed in claim 2, wherein after said pairing step a prepolymerization step is carried out for making the first ribbon (23) integral with the lower surface of the impregnated continuous semifinished product (1), said first ribbon (23) exerting a pulling action on the semifinished product itself.

4. The process as claimed in claim 3, wherein after said prepolymerization step, another pairing step is provided for coupling a second ribbon (43) with an upper surface of the continuous semifinished product (1), said second ribbon (43) moving parallelly to the continuous semifinished product over at least one stretch of said working path.

5. The process as claimed in claim 4, wherein said second ribbon (43) is unwound from a corresponding reel (44) and sent to a stretching roller (45) operating very close to the upper external layer (4) of said continuous semifinished product (1), said stretching roller (45) having a curved conformation presenting a concavity which faces the feed direction of the continuous semifinished product.

6. The process as claimed in claim 3, wherein during said prepolymerization step, said first ribbon (23) rests on a work supporting table (27) and is smoothed and stabilized by second grasping and advancement means (29) acting on either side of the semifinished product (1).

7. The process as claimed in claim 6, wherein said smoothing and stabilization step is performed by a series of upper grippers (30) and a series of lower grippers (31) each carried by respective conveyor chains (32, 33) operating in engagement relationship on said upper external layer (4) and lower external layer (5), respectively.

8. The process as claimed in claim 3, wherein, during said prepolymerization step, the first ribbon (23) sealingly rests on a work supporting table (27) and is smoothed and stabilized by suction means (28) associated with said work supporting table.

9. The process as claimed in claim 2, wherein said first ribbon (23) is unwound from a corresponding reel (24) and is sent to a stretching roller (25) operating very close to the lower surface of said continuous semifinished product (1) said stretching roller (25) having a curved conformation presenting a concavity of which faces the feed direction of the continuous semifinished product.

10. The process as claimed in claim 1, wherein said spacing step for moving one (4) of the external layers apart from the other (5) is carried out by third grasping and advancement means (35) associated with either side of said continuous semifinished product (1) and operating downstream of the impregnation station (7).

11. The process as claimed in claim 10, wherein said spacing step for moving one (4) of the external layers apart from the other (5) is in particular carried out by a series of upper grippers (38) and a series of lower grippers (39), each carried by respective conveyor chains (40, 41) and operating in engagement relationship on said upper external layer (4) and lower external layer (5) respectively, each conveyor chain (40) associated with one side of the continuous semifinished product (1) is inclined and diverges, moving in the upstream-to-downstream direction, from the underlying conveyor chain (41) associated with the same side of the continuous semifinished product (1).

12. The process as claimed in claim 11, wherein for carrying out said spacing step, said grippers (38, 39) act in engagement relationship on longitudinal graspable elements (42) associated with side edges (4a, 5a) of the upper external layer (4), and lower external layer (5).

13. The process as claimed in claim 1, wherein in said alignment step a series of upper grippers (19) and a series of lower grippers (20) each carried by respective conveyor chains (21, 22) act in engagement relationship on said upper external layer (4) and lower external layer (5), respectively.

14. The process as claimed in claim 1, wherein before said polymerization step, an overturning step is provided in which the impregnated continuous semifinished product (1) is substantially rotated through 90° so that it is disposed in a vertical lying plane.

15. The process as claimed in claim 1, wherein after said polymerization step, a soaking step takes place in which a filling resin is injected into said continuous composite material structure (50).

* * * * *